Patented Nov. 13, 1951

2,574,919

UNITED STATES PATENT OFFICE 2,574,919

6-ALKOXY-2-DIALKOXYMETHYL TETRAHYDROPYRANS

Reginald Harold Hall, Sutton, and Herbert Muggleton Stanley, Tadworth, England, assignors to The Distillers Company Limited, Edinburgh, Scotland, a British company No Drawing. Application December 1, 1950, Serial No. 198,731. In Great Britain December 12, 1949

15 Claims. (Cl. 260—333)

1

This invention relates to alkoxy dialkoxymethyl tetrahydropyrans and to a process for the production thereof.

According to the present invention a dihydropyran compound of the formula

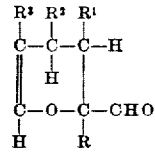

where R, $R^1$, $R^2$ and $R^3$ each represents either hydrogen or an alkyl radical, is reacted with an aliphatic alcohol under substantially anhydrous conditions, in the presence of an acetalisation catalyst to form an alkoxy dialkoxymethyl tetrahydropyran of the formula:

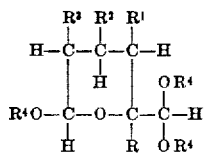

where R, $R^1$, and $R^2$ and $R^3$ have the same significance as indicated above and $R^4$ is the radical derived from the alcohol employed.

The present invention has especial application to the production by the aforedescribed process of alkoxy dialkoxy-methyl tetrahydropyrans of the type

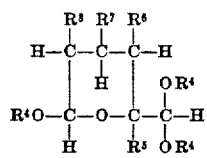

wherein $R^4$ has the significance indicated above and $R^5$, $R^6$, $R^7$ and $R^8$ are hydrogen radicals or lower alkyl radicals such as methyl, ethyl, propyl radicals, at least two of said groups being hydrogen radicals.

The term "acetalisation catalyst" covers any material known to be capable of catalysing the formation of acetals from alcohols and aldehydes, and is suitably an acid catalyst. It is preferred to employ a strong mineral acid such as hydrochloric acid, sulphuric acid or phosphoric acid as the acetalisation catalyst. Strong organic acids for example, such as trifluoroacetic acid, trichloroacetic acid and other haloacetic acids, methane sulphonic acid, ethane sulphonic acid and the like may also be used.

The alcohol employed is most suitably ethyl al-

2 cohol, but other aliphatic alcohols are very suitable and may be used in the process of the present invention.

Among the starting materials which may be used for the process of the present invention may be mentioned, by way of example, the dimer of acrolein which has the formula

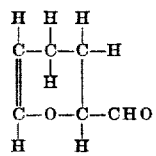

the dimer of methacrolein of the formula

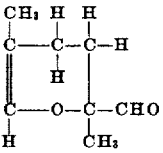

and the cyclic dimer of crotonaldehyde of the formula

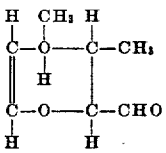

The reaction according to the present invention is very suitably carried out by dissolving the dihydro pyran starting material in the alcohol to be employed and adding to this solution a strong acid, desirably also in solution in the alcohol. Alternatively, the solution of the dihydropyran in the alcohol may be added to the solution of the acid in the alcohol. It is to be noted, however, that the order or manner of mixing the reactants is not in any way critical. The admixture of the two solutions is preferably effected at room temperature, for example 16° C.—20° C., or below, with cooling because of the exothermic nature of the reaction. After the addition of the strong acid to the solution of the dihydropyran starting material has been completed, the mixture is suitably allowed to stand for some time, or an alternative method of operating, which is of particular application in the reaction of ethyl alcohol and methacrolein dimer, is to remove the water of reaction by azeotropic distillation after admixture of the reactants has been completed. Thus, on completion of the admixture of the reactants, a water entrainer such as methylene dichloride may be added to the reaction mixture, and the mixture distilled to remove the water of reaction azeotropically. The products of the reaction may be recovered by neutralising any acid present in the reaction products for example with an alcohol or aqueous solution of sodium hydroxide, sodium bicarbonate and the like, filtering off the inorganic salt formed, and thereafter distilling the product to separate the alkoxy-dialkoxymethyl-tetrahydropyran produced.

The following examples are given to illustrate the process of the present invention. The parts by weight and parts by volume referred to bear the same relation to each other as do grams to millilitres, and the percentages quoted are by weight unless otherwise indicated.

Example 1

A solution of 1.25 parts by weight of anhydrous hydrogen chloride in 50 parts by volume of dry ethyl alcohol is added slowly with stirring to an ice cold solution of 47 parts by weight of acrolein dimer in 200 parts by volume of dry ethyl alcohol, and when the addition is complete the mixture is kept at 0° C. for one hour and then at room temperature for several hours. The product is cooled and a solution of sodium ethoxide in ethyl alcohol added thereto with stirring until it is just alkaline to litmus. Then acetic acid is added thereto until it is just acid to litmus, the product is filtered, and the filtrate separated and distilled with fractionation under reduced pressure. 62.6 parts by weight of 6-ethoxy-2-diethoxymethyltetrahydropyran, boiling point 113–115° C. at 9 mm. mercury, refractive index $n_D^{20}$ 1.4330, are obtained.

Example 2

A solution of 70 parts by weight of methacrolein dimer in 85 parts by volume of substantially anhydrous ethyl alcohol is added slowly with stirring to an ice cold stirred mixture of 1.44 parts by weight of anhydrous hydrogen chloride in 200 parts by volume of substantially anhydrous ethyl alcohol. When the addition is complete 250 parts by volume of methylene dichloride is added thereto and the mixture distilled through a Vigreux column fitted with a phase-separating still-head which decants the upper aqueous layer and returns the lower layer to the column, heating being continued for some time after the liberation of water finally ceases. The product obtained is cooled and carefully neutralised as described in Example 1, and then fractionally distilled under reduced pressure. 48.5 parts by weight of 6-ethoxy-2-diethoxymethyl - 2:5 - dimethyltetrahydropyran, boiling point 125–126° C. at 12 mm. mercury, refractive index $n_D^{20}$ 1.4332, are obtained.

Example 3

A solution of 53 parts by weight of methacrolein dimer in 80 parts by volume of substantially anhydrous methyl alcohol is added slowly to an ice-cold stirred mixture of 0.24 part by weight of anhydrous hydrogen chloride and 150 parts by volume of substantially anhydrous methyl alcohol. When the addition is complete the mixture is kept ice cold for several hours and then at room temperature for 24 hours. The product is cooled and a solution of sodium methoxide in methyl alcohol added thereto with stirring until it is just alkaline to litmus. Then acetic acid is added thereto until it is just acid to litmus, the product is filtered and the filtrate separated and fractionally distilled under reduced pressure. 26.5 parts by weight of 6-methoxy-2-dimethoxymethyl - 2:5 - dimethyltetrahydropyran, boiling point 101–102° C. at 10 mm. mercury, refractive index $n_D^{20}$ 1.4399, are obtained.

Example 4

A solution of 1.42 parts by weight of anhydrous hydrogen chloride in 50 parts by volume of substantially anhydrous methyl alcohol is added slowly with stirring to an ice cold solution of 59 parts by weight of acrolein dimer in 236 parts by volume of substantially anhydrous methyl alcohol. When the addition is complete the mixture is kept at 0° C. for half an hour and then at room temperature for several hours. The product is carefully neutralised as described in Example 3, filtered and then distilled with fractionation under reduced pressure. 71.5 parts by weight of 6-methoxy-2-dimethoxymethyltetrahydropyran, boiling point 94–96° C. at 10 mm. mercury, refractive index $n_D^{20}$ 1.4368 are obtained.

The products obtained according to the present invention have special utility in the chemical industry and may, for example, be used as intermediates in the production of valuable chemical compounds and as frothing agents in the froth flotation of minerals.

We claim:

1. A process for the manufacture of alkoxy dialkoxymethyltetrahydropyrans which comprises reacting a dihydropyran compound of the formula

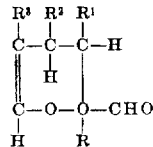

where R, R$^1$, R$^2$ and R$^3$ are each selected from the group consisting of hydrogen and alkyl radicals, with an aliphatic alcohol under substantially anhydrous conditions, in the presence of an acetalisation catalyst to form an alkoxy dialkoxymethyltetrahydropyran of the formula

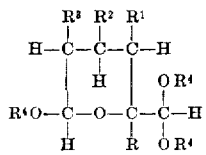

where R, R$^1$, R$^2$ and R$^3$ have the same significance as indicated above and R$^4$ is the radical derived from the alcohol employed.

2. A process as in claim 1, wherein the acetalisation catalyst is hydrogen chloride.

3. A process as in claim 1, wherein the acetalisation catalyst is sulphuric acid.

4. A process as in claim 1, wherein the reaction is carried out at a temperature not in excess of room temperature.

5. A process for the manufacture of 6-alkoxy-2-dialkoxymethyltetrahydropyran which comprises reacting acrolein dimer with an aliphatic alcohol in the presence of an acetalisation catalyst selected from the group consisting of hydrogen chloride and sulphuric acid, and separating the 6-alkoxy-2-dialkoxymethyltetrahydropyran from the product obtained.

6. A process as in claim 5, wherein the aliphatic alcohol is selected from the group consisting of methyl alcohol and ethyl alcohol.

7. A process for the manufacture of 6-alkoxy-2- dialkoxymethyl - 2:5 - dimethyltetrahydropyran which comprises reacting methacrolein dimer with an aliphatic alcohol in the presence of an acetalisation catalyst selected from the group consisting of hydrogen chloride and sulphuric acid and separating the 6-alkoxy-2-dialkoxymethyl-2:5-dimethyltetrahydropyran from the product obtained.

8. A process as in claim 7, wherein the aliphatic alcohol is selected from the group consisting of methyl alcohol and ethyl alcohol.

9. Alkoxy dialkoxymethyl tetrahydropyrans of the formula

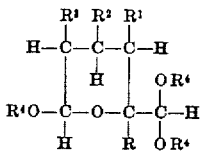

where R, R¹, R², and R³ each represents either hydrogen or an alkyl radical, and R⁴ represents an alkyl radical.

10. 6-alkoxy - 2 - dialkoxymethyltetrahydropyran.

11. 6-alkoxy - 2-dialkoxymethyl-2:5-dimethyltetrahydropyran.

12. 6 - methoxy - 2-dimethoxymethyltetrahydropyran.

13. 6 - ethoxy - 2-diethoxymethyltetrahydropyran.

14. 6 - methoxy - 2-dimethoxymethyl-2:5-dimethyltetrahydropyran.

15. 6-methoxy - 2 - diethoxymethyl - 2:5-dimethyltetrahydropyran.

REGINALD HAROLD HALL.
HERBERT MUGGLETON STANLEY.

REFERENCES CITED

The following references are of record in the file of this patent:

UNITED STATES PATENTS

| Number | Name | Date |
|---|---|---|
| 2,537,579 | Fountain | Jan. 9, 1951 |

OTHER REFERENCES

Parham: J. Am. Chem. Soc. 70, 4187–4189 (1948).

Certificate of Correction

Patent No. 2,574,919                                                           November 13, 1951

REGINALD HAROLD HALL ET AL.

It is hereby certified that error appears in the printed specification of the above numbered patent requiring correction as follows:

Column 2, line 26, for that portion of the formula reading "C—O—C—CH$_3$," read $C$—$C$—$C$—$CH_3$; column 4, lines 3 and 4, for "retractive" read *refractive*; line 38, for that portion of the formula reading "C—O—O—CHO" read $C$—$O$—$C$—$CHO$; column 6, line 9, for "6-methoxy" read *6-ethoxy*;

and that the said Letters Patent should be read as corrected above, so that the same may conform to the record of the case in the Patent Office.

Signed and sealed this 19th day of February, A. D. 1952.

[SEAL]

THOMAS F. MURPHY,
                                                   *Assistant Commissioner of Patents.*